(12) United States Patent
Kammonen

(10) Patent No.: US 7,426,990 B2
(45) Date of Patent: Sep. 23, 2008

(54) PUSHER MECHANISM FOR I.S. MACHINE

(75) Inventor: Jarmo Kammonen, Sundsvall (SE)

(73) Assignee: Emhart Glass S.A. (CH)

( * ) Notice: Subject to any disclaimer, the term of this patent is extended or adjusted under 35 U.S.C. 154(b) by 402 days.

(21) Appl. No.: 11/351,556

(22) Filed: Feb. 10, 2006

(65) Prior Publication Data

US 2007/0187210 A1  Aug. 16, 2007

(51) Int. Cl.
*B65G 47/26* (2006.01)
(52) U.S. Cl. .................................. 198/430; 198/429
(58) Field of Classification Search ............. 198/426, 198/427, 429, 430, 431, 432, 433, 468.01, 198/468.1
See application file for complete search history.

(56) References Cited

U.S. PATENT DOCUMENTS 3,308,922 A * 3/1967 Warren et al. ............. 198/433
3,853,213 A * 12/1974 Lehman et al. ............ 198/429
5,125,496 A * 6/1992 Aguirre-Gandara et al. . 198/430
5,429,651 A * 7/1995 Bolin ....................... 198/430
5,992,613 A * 11/1999 DiFrank .................... 198/430

FOREIGN PATENT DOCUMENTS

WO    2005085145    9/2005

* cited by examiner

*Primary Examiner*—James R Bidwell
(74) *Attorney, Agent, or Firm*—Reinhart Boerner Van Deuren s.c.

(57) ABSTRACT

A pusher mechanism for pushing bottles formed in an I.S. machine from a dead plate to a conveyor. The pusher mechanism includes a pusher finger assembly which is supported by a housing and is movable about an axis of support and about the parallel axis of rotation of the housing. The axis of the two drive gears for effecting these rotations are coaxial.

5 Claims, 2 Drawing Sheets

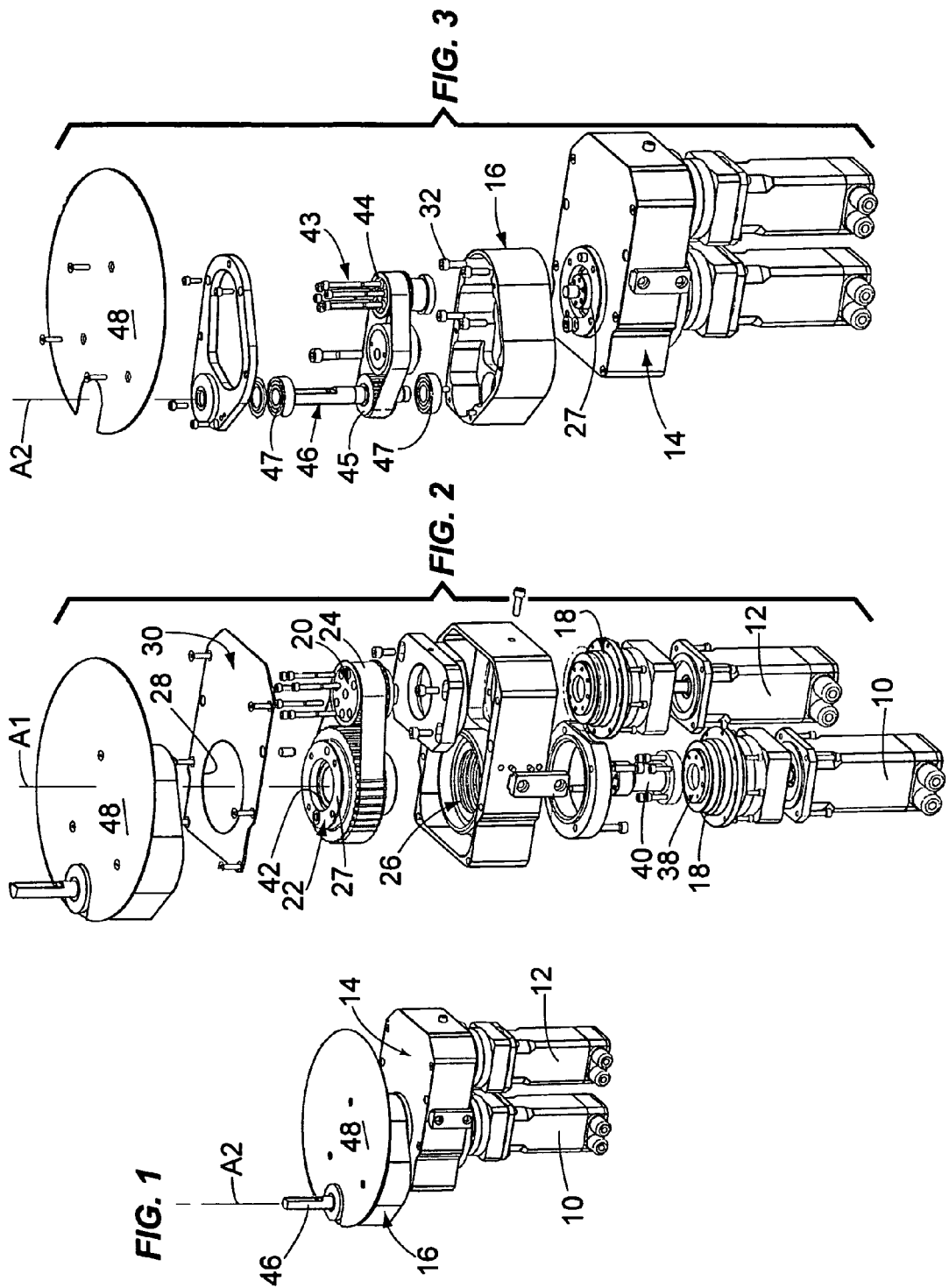

PUSHER MECHANISM FOR I.S. MACHINE

The present invention relates to pusher mechanisms which displace bottles formed in an I.S. machine from a deadplate to a conveyor.

BACKGROUND OF THE INVENTION

Glass bottles formed in an I.S. machine are deposited on a deadplate where they will be cooled for s short period of time and then pushed through an angle of about 90° onto a moving conveyor. Numerous designs are in the public domain: U.S. Pat. Nos. 4,414,758 and 6,702,097, CZ Patents Nos. 288,848 and 295,688, and U.S. Publications 2005/0199011 and 0193773. As the speed of these machines increases, the difficulty involved in controlling the bottles as they are displaced increases.

OBJECT OF THE INVENTION

It is accordingly an object of the present invention to provide a pusher mechanism that can smoothly displace bottles from the deadplate to the conveyor.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE DRAWINGS

FIG. 1 is an oblique view of a pusher mechanism made in accordance with the teachings of the present invention;

FIG. 2 is an exploded oblique view of a portion of the pusher mechanism shown in FIG. 1;

FIG. 3 is an exploded oblique view of another portion of the pusher mechanism shown in FIG. 1.

BRIEF DESCRIPTION OF THE PREFERRED EMBODIMENT

Figure 4:
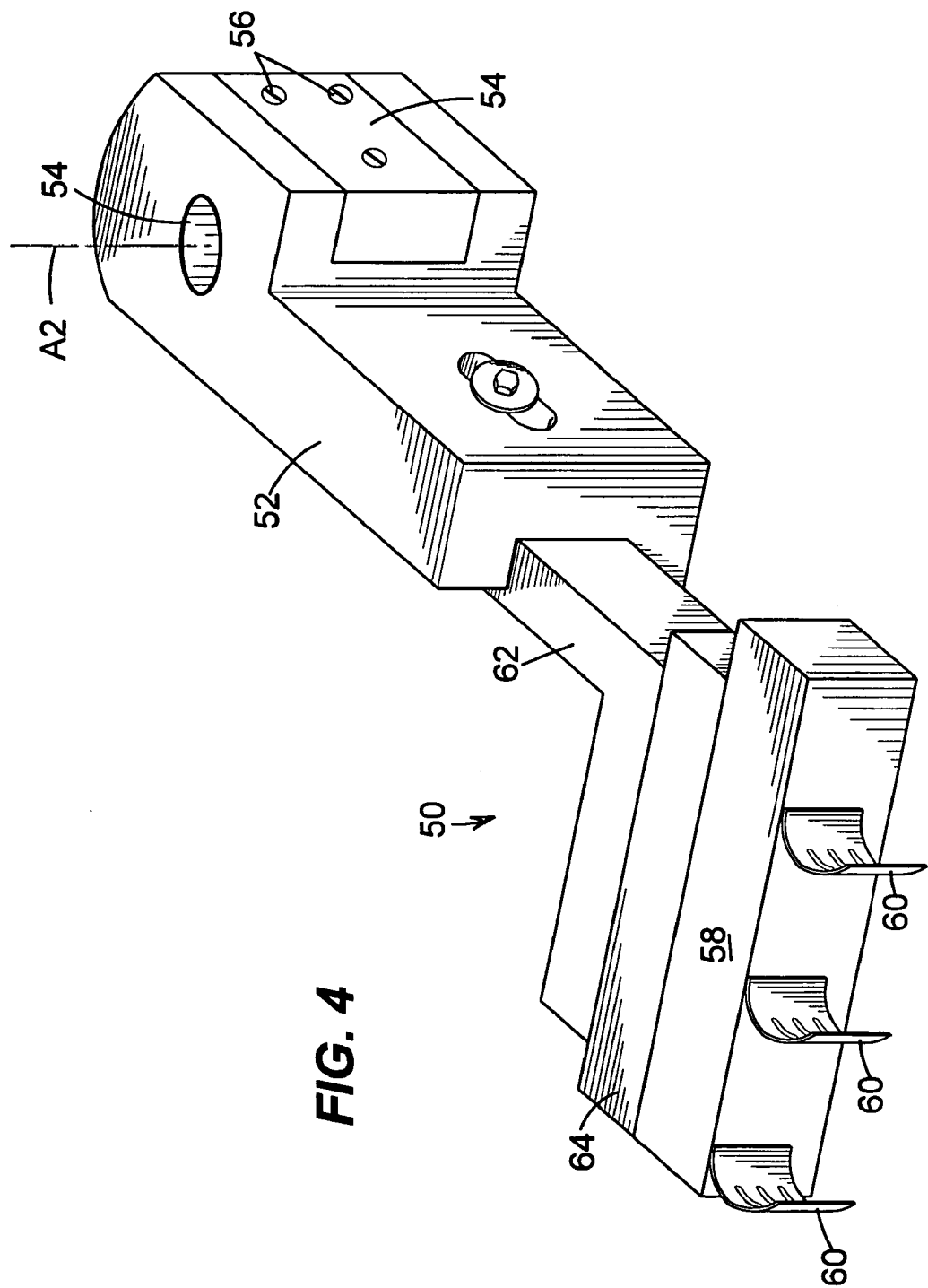
FIG. 4 is an oblique view of a pusher finger assembly.

The pusher mechanism is disclosed in FIG. 1 and includes first and second servo motors 10, 12, a lower pusher housing 14, and an upper pusher housing 16. Referring to FIG. 2, the servo motors are secured to the bottom of the lower pusher housing and each includes a gearbox 18. Secured to the top of the second servo motor is a first drive gear 20 which is interconnected with a first driven gear 22 via a first pulley 24. The first driven gear, which is supported by an annular flat bearing 26 defined in the lower housing, rotates about a first axis A1. The top surface 27 of this first driven gear 22 extends through an opening 28 in the lower housing cover plate 30 and is connected via suitable screws 32 to the bottom of the upper housing. Rotation of the first motor will accordingly result in rotation of the upper pusher housing about the first axis.

Secured to the top 38 of the first motor gearbox is a mounting post 40 which extends vertically upwardly through the central hole 42 in the first driven gear 22. Secured to the top of this mounting post 40, via suitable screws 43, is a second drive gear 44 which is housed within the upper pusher housing 16. Also supported within the upper pusher housing, is a second driven gear 45 mounted on a shaft 46. The shaft 46 is rotatably supported by upper and lower bearings 47 for rotation about a second axis A2. This shaft projects upwardly past the cover plate 48 of the upper pusher housing.

FIG. 4 shows a pusher finger assembly 50 including a bracket 52 having a vertical hole 54 for receiving the shaft 46 (secured by a clamp 54 having a number of screws 56). A finger bar 58 having three bottle engaging fingers 60, is secured to the bracket via an "L" shaped arm 62 and intermediate bracket 64. The pusher finger assembly will be pivoted about axis A2 by operation of the first servo motor 10.

The invention claimed is:

1. A pusher mechanism for pushing bottles formed in an I.S. machine through an angle of about 90° from a deadplate to a moving conveyor comprising a pocket finger assembly including a pocket finger arm having at least one pocket for receiving a bottle on the dead plate,
   a first motor,
   a lower housing,
   an upper housing,
   a first driven gear, having a hollow center, mounted in said lower housing for rotation about a first vertical axis, said first driven gear secured to said upper housing,
   first coupling means for interconnecting said first motor and said first driven gear for rotating said upper housing about said first axis,
   a second motor,
   a second driven gear rotatably mounted on said upper housing for rotation about a second axis parallel to said first axis,
   a first shaft axially vertically upwardly extending from said second driven gear,
   said pocket finger assembly secured to said first shaft for rotation about said second vertical axis,
   second coupling means including a second vertically extending shaft extending through said hollow center of said first driven gear for interconnecting said second motor and said second driven gear.

2. A pusher mechanism according to claim 1, wherein said first coupling means comprises a first drive gear and a first drive pulley interconnecting said first drive gear and said first driven gear.

3. A pusher mechanism according to claim 2, wherein said second coupling means comprises a second drive gear connected and a second drive pulley interconnecting said second drive gear and said second driven gear.

4. A pusher mechanism according to claim 3, wherein said first motor includes a first gear box connected to said first drive gear.

5. A pusher mechanism according to claim 4, further comprising a second gear box connected to said second drive gear.

* * * * *